Dec. 9, 1958     B. R. GLUKES     2,863,239
ANIMATED INDICIA BY COLOR OCCLUSION
Filed Oct. 11, 1954     3 Sheets-Sheet 1

INVENTOR,
BERNARD R. GLUKES
BY
ATTORNEY

Dec. 9, 1958  B. R. GLUKES  2,863,239
ANIMATED INDICIA BY COLOR OCCLUSION
Filed Oct. 11, 1954  3 Sheets-Sheet 2
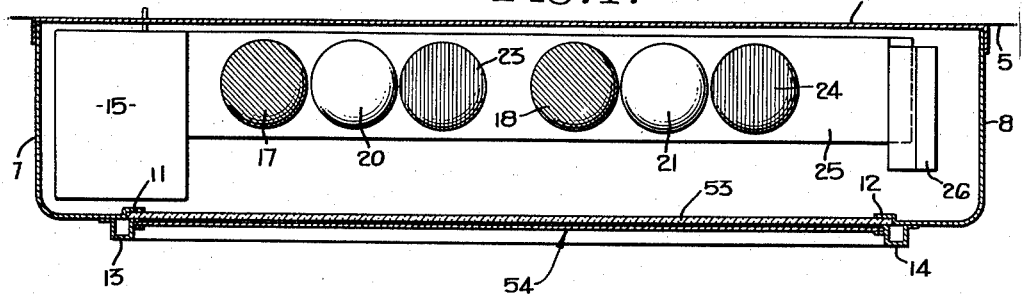
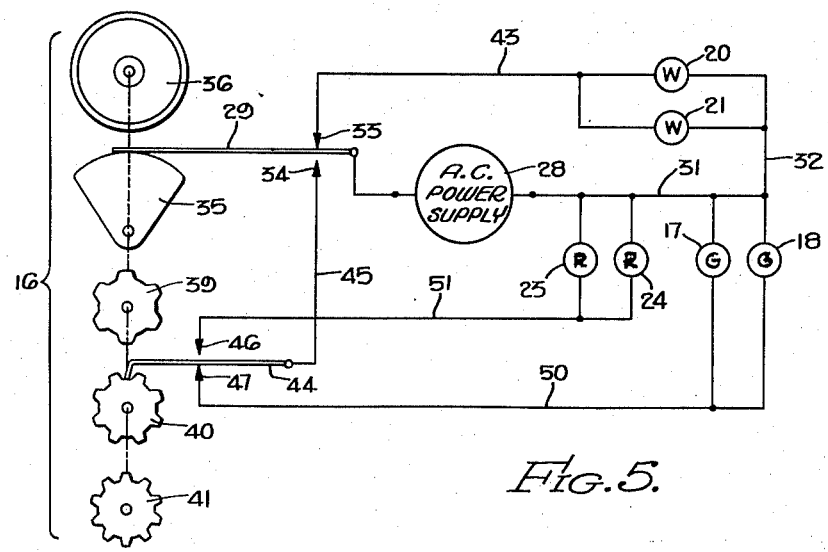
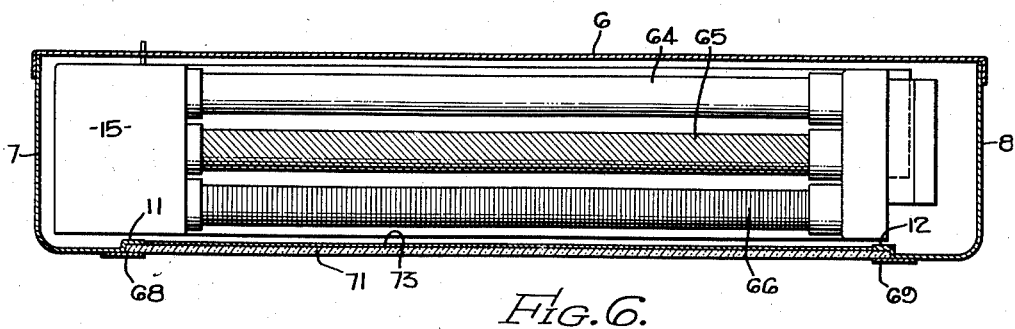
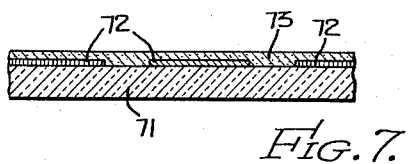
INVENTOR,
BERNARD R. GLUKES
BY
ATTORNEY Dec. 9, 1958     B. R. GLUKES     2,863,239
ANIMATED INDICIA BY COLOR OCCLUSION
Filed Oct. 11, 1954     3 Sheets-Sheet 3

INVENTOR,
BERNARD R. GLUKES
BY
ATTORNEY

United States Patent Office 2,863,239
Patented Dec. 9, 1958

2,863,239

ANIMATED INDICIA BY COLOR OCCLUSION

Bernard R. Glukes, North Hollywood, Calif.

Application October 11, 1954, Serial No. 461,317

13 Claims. (Cl. 40—132)

This invention relates to animated signs or displays, and particularly to animation obtained by the principle of color exclusion or occlusion.

In my U. S. Patent No. 2,300,447, of November 3, 1942, I disclosed and claimed an animated sign using the principles of color occlusion to produce animation. By the use of substantially complementary colors and an alternation of complementary light sources, a color may be caused to disappear or become opaque and another color to become visible by comparison. In this prior patent, I have disclosed that the rate of change of the animation may be controlled in a certain way by a certain arrangement of the colored indicia to provide certain effects on the observer.

The present invention is an improvement over my prior device by providing improved mechanism for obtaining colored alternations and an improved arrangement of the colored indicia to increase the animation effects while reducing possible eye fatigue. The principal feature of this invention is the use of a third light source which includes all the colors, namely, white light, in combination with colored segments and white or non-colored and/or transparent segments in the indicia of a display or sign. The new combination creates a greater illusion of motion by obtaining a greater separation between the apparent moving elements by providing border separation areas between the colored segments of the indicia. These separating areas of non-colored elements not only provide increased separation but they take on the hues of colored elements, which has been found to reduce eye fatigue during the operation of the sign.

Another feature is a control circuit which provides different periods of illumination of the different elements of the sign with respect to one another and which is adjustable to vary the animation effect with the minimum of eye fatigue, depending upon the nature of the particular sign or indicia being presented.

Another feature is in the construction of the sign itself, which makes it economical to construct, particularly for large signs of the billboard type.

The principal object of the invention, therefore, is to facilitate the presentation of indicia and signs by the principle of color occlusion.

Another object of the invention is to provide an improved animated sign or display using the principles of color occlusion.

A further object of the invention is to provide an improved structure and control system for an animated sign or display using the principle of color occlusion.

The novel features which are believed to be characteristic of this invention, both as to the manner of its organization and the mode of its operation, will be better understood from the following description, when read in conjunction with the accompanying drawings, in which:

Fig. 4 is a cross-sectional view taken along the line 4—4 of Fig. 1;

Fig. 5 is a diagrammatic and schematic view of the control circuit of the invention;

Fig. 6 is a cross-sectional view showing a modification of the light source arrangement embodied in the invention;

Fig. 7 is a detail view showing the indicia structure of the modification shown in Fig. 6;

Figure 1:
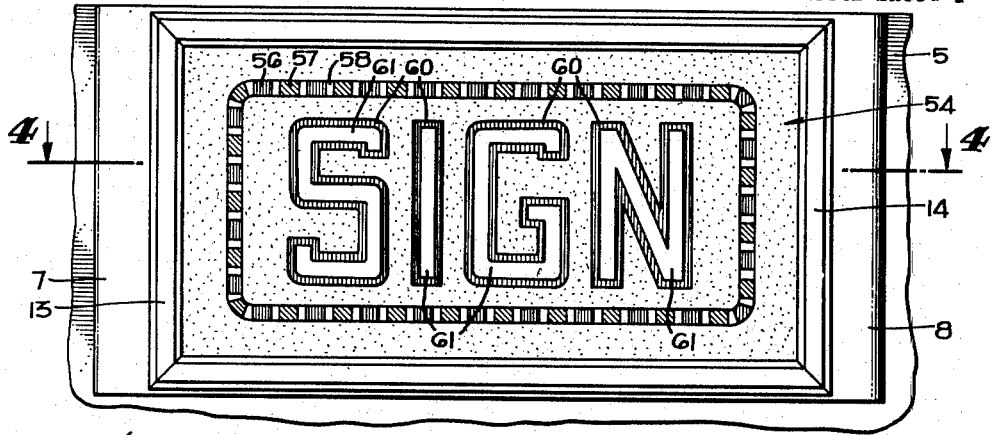
Fig. 1 is a front elevational view of a display sign embodying the invention and showing one step in its illumination.

Referring now to the drawings, in which the same numerals identify like elements, the sign shown in Figs. 1 to 4, inclusive, comprises a mounting board 5, to which is attached the casing housing the sign. This casing consists of a back plate 6 and end plates 7 and 8, terminating in edges 11 and 12 forming sockets. Attached by any suitable means to adjacent edges 11 and 12 are indicia holding brackets 13 and 14. Enclosed within the sign casing is a housing 15 enclosing light control elements 16. At the rear of the casing are shown two incandescent lamps 17 and 18 producing green light, two lamps 20 and 21 producing white light, and two lamps 23 and 24 producing red light. To obtain the lights of the red and green portions of the spectrum, the lamps may be painted with or dipped in a paint. The bulbs of the lamps 20 and 21 are clear to provide white light. These lamps are mounted on a bracket 25 anchored at 26 in any suitable manner. The lamps are energized in serial order at mutually exclusive intervals, which will be described hereinafter, in connection with the circuit shown in Fig. 5.

Referring now to Fig. 5, which shows the control circuit for the lamps, a power supply 28 may be of any suitable source, such as the normal commercial house supply of 110 volts at 60 cycles. The power supply is connected to a switch armature or swinger 29 and directly to the terminals of all the lamps over conductors 31 and 32. The contact swinger 29 is moved between contacts 33 and 34 by a cam segment 35 driven by a motor 36. Also mounted on the shaft of motor 36 are three switch operating wheels 39, 40, and 41, the units 35, 36, 39, 40 and 41 being arranged as shown for the purpose of clarity, it being understood that they are all mounted in parallel planes on the shaft driven by motor 36. As the segment 35 rotates, the contact 33 will be made when the cam segment 35 passes through an arc of substantially 45 degrees, as shown in the drawing, although it is to be understood that the period that contact 33 is made may be predetermined by either the speed of the motor 36 or the ratio of the high portion of the cam 35 to its low portion or both.

As shown in the drawing, contact 33 is made and power is being supplied over the contact 33 and conductors 31, 32, and 43 to lamps 20 and 21, furnishing white light. Since the contact 34 controls the colored light sources, they will not be illuminated during the period that the indicia is illuminated with white light. As soon as the switch contact swinger 29 drops back to contact 33, this contact will be made, contact 33 broken, and power will be supplied to switch swinger 44 over conductor 45. Swinger 44 is adapted to be moved between contacts 46 and 47 by any one of the wheels 39, 40, and 41, these wheels having different numbers of high portions which connect contact 46 to the power supply and different numbers of low sections which connect swinger 44 to contact 47. The swinger 44 is adapted to be moved from wheel to wheel to obtain different rates of alternations of the colored lamps. For instance, as shown in the drawing, when contacts 47 and 34 are made, energy will be supplied to green lamps 17 and 18 over conductors 31, 45 and 50. When contact 46 is made, energy will be supplied to red lamps 23 and 24 over conductors 31, 45 and 51. Thus, the lamps are energized in serial order, the colored light sources receiving different numbers of energizations during the period when the white light sources are de-energized. When the white light sources are energized, the colored lamps are de-energized.

Figure 2:
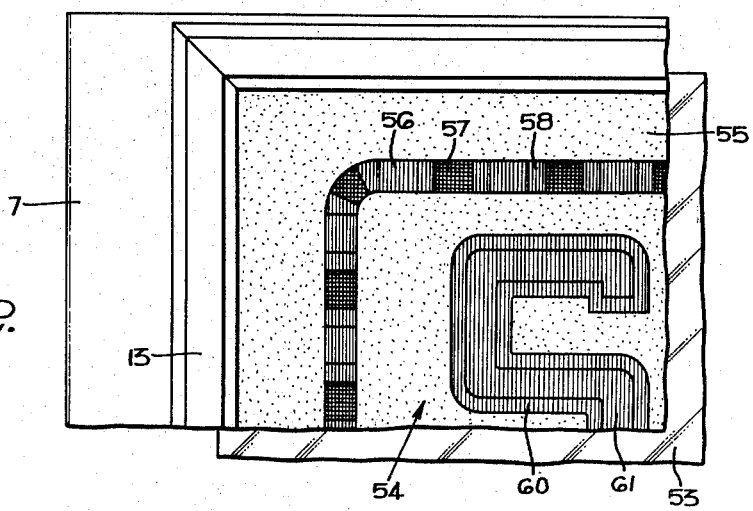
Fig. 2 is an enlarged partial view of the sign of Fig. 1 showing a second step in its illumination.
Figure 3:
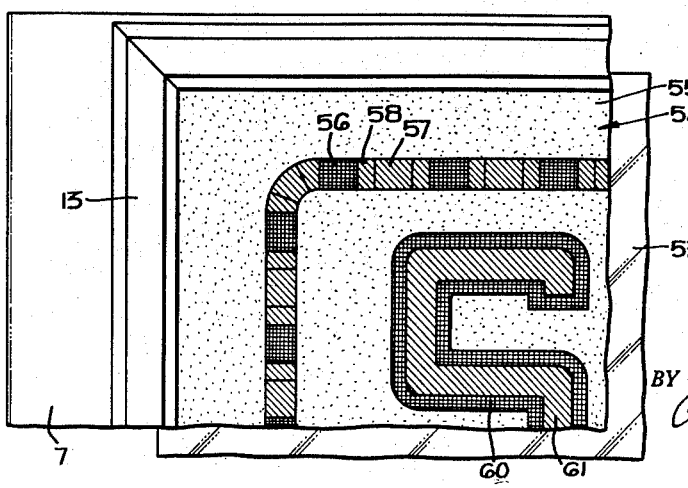
Fig. 3 is an enlarged partial view corresponding to Fig. 2 showing a third step in its illumination.

Referring now to the Figs. 1 to 4, inclusive, the open window in the casing has an opalescent plate, ground glass plate, or other suitable form of light diffuser 53 mounted in sockets 11 and 12. Positioned adjacent the light diffusing plate 53 is a separate indicia carrying plate 54 mounted in the sockets of brackets 13 and 14, this indicia carrying plate being of any suitable material, such as Celluloid, glass, or similar material which will transmit light. As shown in Figs. 1 to 3, inclusive, the plate 54 is painted to provide a gray background 55, colored segments 56 and 57, and transparent or colorless light transmitting segments 58, which form the border for the word "Sign". It is to be understood, of course, that the word "Sign" is only for illustrative purposes and that any other advertising matter in the form of words or design may be positioned within the border. The particular word shown has colored borders 60 and central colorless transparent areas 61. Thus, the cross-section markings indicate the colors, the vertical lined sections 56 of the border and the areas 60 of the sign are colored red while the angle cross-section markings are colored green. Since this invention utilizes color occlusion based on complementary colors, it will be realized that the red light source will transmit color through the red sections 56 while the green sections 57 will absorb and not transmit the red light waves. Thus, when the indicia is illuminated with red light, the red elements will appear as red while the green elements will appear dark. Reversely, when the indicia is illuminated with green light, the green elements will appear green while the red elements will appear black.

When the indicia is illuminated with white light, the colorless areas 61 and elements 58 dividing the color segments will be white while the sections 56 and 57 will appear in their respective colors, since they will transmit only the light waves corresponding to these colors. Thus, as shown in Fig. 1, we have the red and green elements appearing in those colors while the elements 58 in areas 61 will appear without color. The illumination of the color areas will be at a certain intensity when illuminated with a white light.

Now in Fig. 2 showing the appearance of the indicia when illuminated with red light, the red elements 56 will appear red while the green elements 57 will be black and the colorless elements 58 will take on a red hue at a lesser intensity than the red elements 56 and 60. The clear areas 61 will, of course, take on a red hue while the border 60 of the letters will be a red color of higher intensity than when illuminated with white light.

In Fig. 3, the effect of green light illumination is shown. In this step, the red segments 56 now appear black, the white segments 58 take on a green hue, and the green segments 57 appear green. Furthermore, the border 60 of the letters now becomes black while the central area 61 takes on a green hue. The gray background at all times will also take on a slight color in accordance with the color of the illumination of the indicia as of that time, although the background may be of any density to exclude more or less light, depending on the character of the display.

There is thus provided an animation of letters which is a contraction and an expansion of the size of the letters. This is produced by the alternate color illumination of the borders of the letters to alternately eliminate and reinstate the border while the central portion of the letters becomes white and then alternately assumes the hues of the illuminating sources. It has been found that by giving the eye a period of relaxation by the illumination of the indicia by white light with low intensity color presentations, and then for over a predetermined period alternately changing the border of the sign from visible to invisible, that a more attractive sign from the observation standpoint is obtained as well as a sign having a greater amount of motion. Also, the border of the sign appears to be moving. This has been found to be an improvement over an arrangement of indicia shown in my above-mentioned patent wherein the color segments have practically no area of separation between them or only an opaque separation. A combination of white light and opaque separation can be used to produce certain special effects.

As mentioned above, the colored lamps are painted or dipped in a special non-fading, heat resisting, paint formula, and this same paint pigment with a pigment vehicle is used in forming the indicia shown in Figs. 1 to 3, inclusive. By the use of the same paint for both the colored light sources and the indicia with which the light sources cooperate, a better light transmission and occlusion is provided. Although the colors red and green have been described above, other color combinations are possible, such as red and turquoise, red and blue, orange and blue, or any pair of substantially complementary colors.

Referring now to Figs. 6 and 7, the casing 6, 7, and 8 is shown containing the motor mechanism 16 in the case 15, but wherein three incandescent or gas-filled light tubes 64, 65, and 66 are shown. These may be placed in the same vertical plane or in three vertical planes and three horizontal planes. One tube may provide white light and the other tubes red and green light. The colored light may be obtained by painting the outside of the tubes with the same paint used on the incandescent lamps mentioned above, or by the use of a gas which will provide the desired color.

The window in the casing is provided with the plates 68 and 69, which cooperate with ends 11 and 12 for holding a daylight eliminating element 71. This element 71 also carries the indicia. It may be of a plastic which will relieve eye strain by eliminating much of the ultra-violet. On the inner surface of the element 71 is painted the sign indicia 72 with paint of the desired color. After the indicia 72 is painted on the plate 71, it is then sprayed with a light diffusing paint 73 of any suitable type which will provide light diffusion while permitting white light to be transmitted through the spaces between the painted indicia element 72. This construction is not only economical but provides better daylight observation of the indicia and reduces eye strain.

Figure 8:
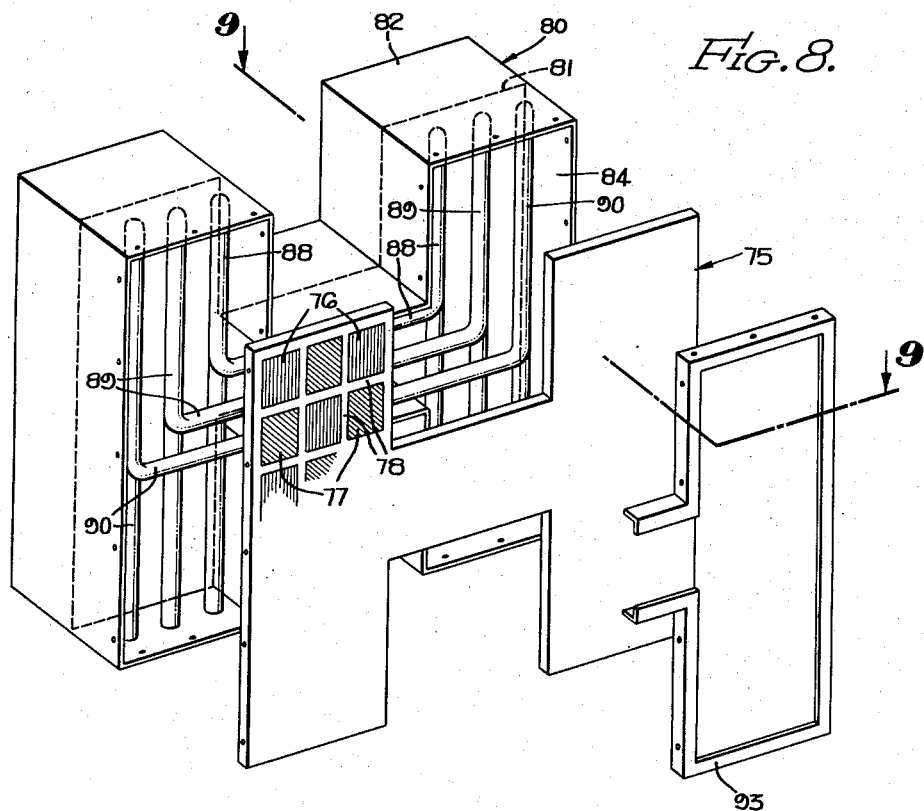
Fig. 8 is an exploded perspective view showing the construction of large signs embodying the invention.
Figure 9:
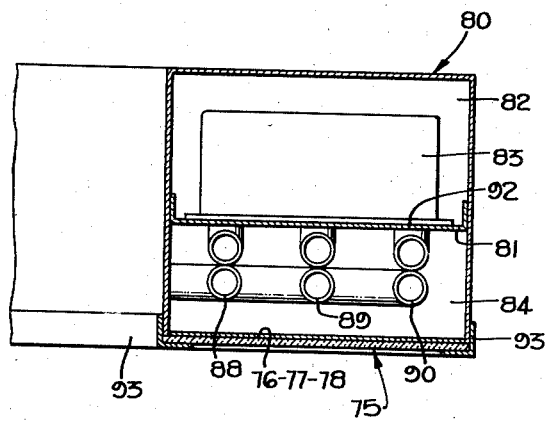
Fig. 9 is a detailed view showing the construction of the sign in Fig. 8 and taken along the line 9—9 of Fig. 8.

To illustrate a practical and commercial construction of a sign utilizing the features shown in Figs. 6 and 7, reference is made to Figs. 8 and 9. In large outdoor sign displays, large letters are generally constructed separately and mounted in any suitable manner. In Figs. 8 and 9, the letter "H" is used as an illustration. The letter itself shown at 75 is made of a light transmitting or opal plastic of the type shown at 71 in Figs. 6 and 7. On the back surface of the letter plate 75 are painted alternate elements of various configurations, square rectangular forms being shown at 76 and 77 hatched to indicate red and green colors, these elements being separated by translucent light transmitting areas 78. After these are painted on the back of the plate 75, the back surface is then sprayed with the light diffusing material as shown at 73 in Figs. 6 and 7. The plate 75 is then mounted against a box or housing 80 divided by a partition 81, the back portion 82 of which will house the transformers, motors, and other control apparatus as shown at 83 in Fig. 9. In the front portion 84 of the casing are mounted a plurality of elongated gas-filled tubular lamps in any desired number to provide the proper illumination. That is, tube 88 may provide red light, tube 89 green light, and tube 90 white light. The colored light tubes may provide the proper colors by outside painting or by the use of gases within the tube. These tubes are positioned within the section 84 in any desired way, such as being mounted on a plate 92 and can extend behind all portions of the plate 75. The plate 75 is held in position on the casing 80 by angle frame molding 93.

The operation of the construction shown in Fig. 8 is the same as that described in connection with Figs. 1 to 5, inclusive. That is, when the white light transmitting areas 78 are illuminated with white light, the colored elements 76 and 77 take on their respective colors at a certain intensity. When green light is impressed on the indicia, the green alements appear brightly green, the red elements appear black, and the white areas take on a green hue. When the red lamps are energized, the red elements appear brifiht, the green elements are black, and the white separating areas take on a red hue. By using white light transmitting areas separating the color elements, the shifting visibility between the colored elements provides greater animation than heretofore provided with less eye strain, the eye strain being reduced by controlling the periodicity of the lighting with the white light and the periodicity of the alternations of the colored lights. The sign construction shown in Figs. 6 to 9, inclusive, is particularly suitable for large outdoor displays to provide the minimum cost of construction.

Although certain letters and color element arrangements have been shown for purposes of illustration, it will be understood that various configurations of indicia elements may be used. For instance, the letters may be provided with different colored borders while providing the white light central areas. That is, two colored borders may be used for each letter, the colored borders being separated by a white area as well as providing a white central area as described above. The enhanced animation is obtained by separating the colored elements by white light transmitting areas which are illuminated along with the color elements, eye strain being reduced by having the white areas take on the hue of the bright colored elements.

What is claimed is:

1. An animated indicia system comprising at least one source of colored light, a source of white light, means for energizing said sources at predetermined mutually exclusive intervals, a light transmission indicia having substantially complementary color elements separated by white light transmitting elements, one of said color elements being substantially complementary to said colored light source, and means for controlling the illumination of said indicia elements.

2. An animated indicia system in accordance with claim 1, in which a light diffusing medium is provided between said indicia and said light sources.

3. An animated indicia system in accordance with claim 2, in which a plate is provided on which said colored indicia is supported, said plate providing elimination of a portion of the spectrum.

4. An animated indicia system in accordance with claim 1, in which a mechanical commutator is provided to energize said white light sources for a predetermined time period and energize said colored light sources in different time periods.

5. An animated sign comprising a light transmitting plate having different colored sections to be illuminated, separated white light transmitting sections between said colored sections, a light diffusing material over said sections, a casing to one side of which said plate is attached, different colored light sources in said casing, white light sources in said casing, and means for energizing said light sources at mutually exclusive intervals, the colored light provided from said colored light sources being complementary to each other and the same as the colors of the respective colored sections.

6. An animated sign in accordance with claim 5, in which said last-mentioned means includes a commutator adapted to energize said white light sources over a period of appreciable length, and said colored light sources alternately over periods of less length during the periods of extinction of said white light sources.

7. An animated sign in accordance with claim 5, in which said plate is a light transmitting plastic and said light diffusing material is painted over said colored and white light transmitting sections, said light diffusing material being between said light source and said light transmitting sections.

8. An animated sign in accordance with claim 5, in which said light sources are gas filled tubes, the gas providing the said colors.

9. An animated indicia system comprising sources of differently colored lights, a source of white light, means for energizing said light sources at predetermined mutually exclusive intervals, light transmission indicia with elements having colors complementary to the colors of said colored light sources to appear black when said sources are alternatively energized, said transmission indicia having a white light transmission element to take on the color of any energized light source, and means for diffusing the light passing through all elements of said indicia.

10. An animated indicia system in accordance with claim 9 in which a background for said indicia provides for the transmission of light from said sources with the hue of said energized source and with an intensity depending on the density of said background.

11. An animated indicia system in accordance with claim 9 in which said white light transmission element of said indicia is surrounded by a color transmission element having a color corresponding to one of said colored light sources and a color complementary to another of said colored light sources.

12. An animated indicia system comprising at least one source of colored light, a source of white light, means for energizing said sources at predetermined mutually exclusive intervals, a light transmission indicia having substantially complementary color elements separated by white light transmitting elements, means for controlling the illumination of said indicia elements, said indicia elements including letters having a central portion transmitting said white light and a colored outer border alternately made relatively visible and invisible by the alternate illumination of said colored light sources.

13. An animated indicia system comprising sources of differently colored lights, a source of white light, means for energizing said light sources at predetermined mutually exclusive intervals, light transmission indicia with elements having colors complementary to the colors of said colored light sources to appear black when said sources are alternately energized, said transmission indicia having a white light transmission element to take on the color of any energized light source, and means for diffusing the light passing through all elements of said indicia, said system including a light transmitting plate on one side of which the light transmitting elements are painted, and said means for diffusing the light being painted to cover said light transmitting elements, said light diffusing paint being between said elements and the light impressed thereon.

References Cited in the file of this patent

UNITED STATES PATENTS

| | | | |
|---|---|---|---|
| 643,872 | Hill | Feb. 20, | 1900 |
| 655,264 | Nichol | Aug. 7, | 1900 |
| 1,219,731 | Hall | Mar. 20, | 1917 |
| 1,276,494 | Craig | Aug. 20, | 1918 |
| 1,342,247 | Bittinger | June 1, | 1920 |
| 1,348,957 | Pope | Aug. 10, | 1920 |
| 1,357,783 | Leachman | Nov. 2, | 1920 |
| 1,374,282 | Craig | Apr. 12, | 1921 |
| 1,481,607 | Hiscocks | Jan. 22, | 1924 |
| 1,737,092 | Pearson et al. | Nov. 26, | 1929 |
| 2,106,699 | Best | Feb. 1, | 1938 |
| 2,300,447 | Glukes | Nov. 3, | 1942 |
| 2,345,998 | Apuzzo | Apr. 4, | 1944 |